United States Patent
Huang et al.

(10) Patent No.: US 9,636,775 B2
(45) Date of Patent: May 2, 2017

(54) COMPOSITE BEAM GENERATOR AND POWDER MELTING OR SINTERING METHOD USING THE SAME

(71) Applicant: INDUSTRIAL TECHNOLOGY RESEARCH INSTITUTE, Hsin-Chu (TW)

(72) Inventors: Wei-Chin Huang, Tainan (TW);
Ping-Han Wu, Tainan (TW);
Kuang-Po Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 313 days.

(21) Appl. No.: 14/583,398

(22) Filed: Dec. 26, 2014

(65) Prior Publication Data
US 2016/0184925 A1    Jun. 30, 2016

(30) Foreign Application Priority Data
Dec. 24, 2014    (TW) .............................. 103145237 A

(51) Int. Cl.
*B23K 26/06* (2014.01)
*B23K 26/342* (2014.01)
(Continued)

(52) U.S. Cl.
CPC ........ *B23K 26/0608* (2013.01); *B22F 3/1055* (2013.01); *B23K 26/0626* (2013.01);
(Continued)

(58) Field of Classification Search
CPC ............ B23K 26/0608; B23K 26/0626; B23K 26/342; B23K 26/0648; B29C 67/0077;
(Continued)

(56) References Cited

U.S. PATENT DOCUMENTS

| 4,209,793 A | 6/1980 | Ueno |
| 4,449,215 A | 5/1984 | Reno |

(Continued)

FOREIGN PATENT DOCUMENTS

| CN | 202343945 U | 7/2012 |
| DE | 102013103096 A1 | 10/2013 |

(Continued)

OTHER PUBLICATIONS

European Patent Office, Partial European search report issued on May 2, 2016.
(Continued)

*Primary Examiner* — Samuel M Heinrich
(74) *Attorney, Agent, or Firm* — Rabin & Berdo, P.C.

(57) ABSTRACT

This disclosure provides a composite beam generator and a method of performing powder melting or sintering in additive manufacturing process using the same. The composite beam generator comprises: a beam splitter for splitting a beam into a first directed beam and a second directed beam; a beam shaper for shaping a transverse energy distribution profile of the second directed beam to non-circular; at least one beam delivery unit for guiding the first directed beam or the second directed beam; and a beam combiner for receiving the first directed beam and the second directed beam, and respectively generating a first output beam and a second output beam, and combining them into the composite beam.

27 Claims, 6 Drawing Sheets

(51) Int. Cl.
- B28B 1/00 (2006.01)
- B28B 17/00 (2006.01)
- B29C 67/00 (2006.01)
- B22F 3/105 (2006.01)
- B33Y 10/00 (2015.01)
- B33Y 30/00 (2015.01)

(52) U.S. Cl.
CPC ........ *B23K 26/0648* (2013.01); *B23K 26/342* (2015.10); *B28B 1/001* (2013.01); *B28B 17/0063* (2013.01); *B29C 67/0077* (2013.01); *B29C 67/0088* (2013.01); *B22F 2003/1057* (2013.01); *B33Y 10/00* (2014.12); *B33Y 30/00* (2014.12)

(58) Field of Classification Search
CPC ... B29C 67/0088; B22F 3/1055; B28B 1/001; B28B 17/0063
USPC ..... 219/76.1, 76.12, 121.16, 121.17, 121.65, 219/121.66; 427/470
See application file for complete search history.

(56) References Cited

U.S. PATENT DOCUMENTS

| | | | |
|---|---|---|---|
| 5,393,482 | A | 2/1995 | Benda et al. |
| 5,508,489 | A | 4/1996 | Benda et al. |
| 5,790,621 | A | 8/1998 | Picco et al. |
| 6,007,764 | A | 12/1999 | Benda et al. |
| 6,048,954 | A | 4/2000 | Barlow et al. |
| 6,312,134 | B1 | 11/2001 | Jain et al. |
| 6,524,977 | B1 | 2/2003 | Yamazaki et al. |
| 6,577,380 | B1 | 6/2003 | Sposili et al. |
| 7,042,631 | B2 * | 5/2006 | Smith .................... G02B 6/032 359/333 |
| 7,491,909 | B2 | 2/2009 | Yamamoto et al. |
| 7,569,441 | B2 | 8/2009 | Tanaka |
| 8,518,838 | B2 | 8/2013 | Carey et al. |
| 2003/0052105 | A1 | 3/2003 | Nagano et al. |
| 2003/0063884 | A1 * | 4/2003 | Smith .................... G02B 6/032 385/129 |
| 2007/0014392 | A1 * | 1/2007 | Madey .................... H05G 2/00 378/119 |
| 2012/0237745 | A1 | 9/2012 | Dierkes et al. |
| 2013/0140288 | A1 | 6/2013 | Yu et al. |
| 2014/0263209 | A1 | 9/2014 | Burris et al. |

FOREIGN PATENT DOCUMENTS

| | | |
|---|---|---|
| EP | 0724494 A1 | 8/1996 |
| EP | 2292357 A1 | 3/2011 |
| EP | 2454039 A1 | 5/2012 |
| EP | 2464477 A1 | 6/2012 |
| TW | 201120480 A | 6/2011 |
| WO | WO-2011018463 A1 | 2/2011 |
| WO | WO-2013092997 A1 | 6/2013 |

OTHER PUBLICATIONS

Taiwan Patent Office, Office Action issued on Aug. 1, 2016.
European Patent Office, Extended European Search Report issued on Aug. 11, 2016.
Buchbinder et al., Investigation on Reducing Distortion by Preheating During Manufacture of Aluminum Components Using Selective Laser Melting, Laser Institute of America, vol. 26, No. 1, Feb. 2014, pp. 012004-1-012004-10.
Mumtaz et al., Selective Laser Melting of Thin Wall Parts Using Pulse Shaping, Journal of Materials Processing Technology, 2010, pp. 279-287.
Sparks et al., Effect of Structured Laser Pulses on Grain Growth in H13 Tool Steel, pp. 261-267.
Kim et al., Fabrication of Parts and Their Evaluation Using a Dual Laser in the Solid Freeform Fabrication System, Journal of Materials Processing Technology, 2009, pp. 4857-4866.
Bransch et al., Effects of Pulse Shaping on Nchyag Spot Welds in Austenitic Stainless Steel, Welding Research Supplement, Jun. 1994, pp. 141-151.

* cited by examiner

COMPOSITE BEAM GENERATOR AND POWDER MELTING OR SINTERING METHOD USING THE SAME

This application claims the benefit of Taiwan application Serial No. 103145237 filed Dec. 24, 2014. The subject matter of which is incorporated herein by reference.

TECHNICAL FIELD

The present disclosure relates to powder melting or sintering, and more particularly, to a composite beam generator and a method of performing powder melting or sintering using the composite beam generator.

BACKGROUND

Additive Manufacturing (AM) is a technique to repeat layering of material in order to create structural components. Selective Laser Sintering (SLS) and Selective Laser Melting (SLM) are two excellent ways in the art. As to fabricate a targeted object, a powder is deposited onto a work surface first. Then, laser irradiated the powder and molten or sintered layer by layer to form the object.

In the process of Selective Laser Melting, the solidification is restricted by the optimized parameters to get the fully dense object. Thus the material microstructure and property is difficult to be optionally controlled in the object. Therefore, it is in need to develop a new technique to control the selective powder melting/sintering process.

SUMMARY

According to one aspect of the present disclosure, one embodiment provides a composite beam generator. It comprises a first directed beam having a first transverse energy distribution profile for melting or sintering a powder and a second directed beam having a second transverse energy distribution profile of non-circular. The second is for adjusting the temperature variation of the powder before and/or after the powder melted to control the solidification. A beam combiner is for receiving the first and the second directed beam, and combining them into a composite beam.

In one embodiment, the beam combiner is selected from a group consisting of a non-polarizing beam combiner, a polarizing beam combiner, and an optical fiber coupler.

In one embodiment, the second directed beam comprising a shape of line, rectangle, oval, triangle, teardrop, or dumbbell.

In one embodiment, each of the first and second directed beams is a continuous-wave laser beam or a pulsed laser beam.

According to another aspect of the present disclosure, another embodiment provides a composite beam generator for performing powder melting or sintering. It comprises a beam splitter for splitting a beam into a first directed beam and a second directed beam. A beam shaper shapes a transverse energy distribution profile of the second directed beam to make it non-circular. At least one beam delivery unit changes the proceeding direction of the first directed beam and the second directed beam. A beam combiner receives the first directed beam and the second directed beam that passing through the beam shaper. The first output beam and the second output beam are combined into a composite beam.

In one embodiment, the apparatus further comprises a laser source for generating the optical beam to be provided for the beam splitter.

In one embodiment, the beam delivery unit comprises a mirror, an optical fiber, a prism, or the combination thereof.

In one embodiment, the second output beam has a transverse energy distribution profile comprising a shape of line, rectangle, oval, triangle, teardrop, or dumbbell.

In one embodiment, the apparatus further comprises an energy regulator for regulating energy ratios of the first output beam to the first directed beam and/or the second output beam to the second directed beam.

In one embodiment, the second directed beam after split from the beam splitter is directed to an energy regulator, so that the second directed beam is regulated by the energy regulator.

In one embodiment, the energy regulator is selected from a group consisting of a polarization regulator, an energy attenuator, and an energy amplifier.

In one embodiment, the beam splitter is selected from a group consisting of a non-polarizing beam splitter, a polarizing beam splitter, and an optical fiber coupler.

In one embodiment, the beam shaper is selected from a group comprising a cylindrical lens, a diffractive optical element, and a spatial light modulator.

In one embodiment, the beam combiner is selected from a group consisting of a non-polarizing beam combiner, a polarizing beam combiner, and an optical fiber coupler.

In one embodiment, the laser source has a wavelength between 0.2 μm and 100 μm.

In one embodiment, the laser source is a continuous-wave laser or a pulsed laser.

According to another aspect of the present disclosure, another embodiment provides a method for performing powder melting or sintering. It comprises the following steps of providing a powder layer on a surface and irradiating the powder layer with a composite energy beam which includes a first directed beam and a second directed beam. The composite energy beam selectively melts or sinters the powder layer. The first directed beam has a first transverse energy distribution profile for melting or sintering the powder in a powder layer. The second directed beam has a second transverse energy distribution profile with non-circular for adjusting the temperature variation of the powder layer before or after the powder being melted to control the solidification.

In one embodiment, the first transverse energy distribution profile has an area between 1 $\mu m^2$ and 100 $mm^2$.

In one embodiment, the second directed beam has a transverse energy density being from 0.01 to 0.99 times that of the first directed beam.

In one embodiment, the second transverse energy distribution profile has a shape of line, rectangle, oval, triangle, teardrop, or dumbbell.

In one embodiment, the composite energy beam is a continuous-wave laser beam, a pulsed laser beam, an electron beam, an electric arc, or the combination thereof.

In one embodiment, the powder is made from metal, ceramic, polymer, or the mixture thereof.

Further scope of applicability of the present application will become more apparent from the detailed description given hereinafter. However, it should be understood that the detailed description and specific examples, while indicating exemplary embodiments of the disclosure, are given by way of illustration only. Since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below. The accompanying drawings are given by way of illustration only Thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following. Reference will now be made in detail to the preferred embodiments, examples of which are illustrated in the accompanying drawings. In the following description of the embodiments, it is to be understood that although the terms "first", "second" and "third" are used to describe various elements, these elements should not be limited by the term. Also, unless otherwise defined, all terms are intended to have the same meaning as commonly understood by one of ordinary skill in the art.

Figure 1:
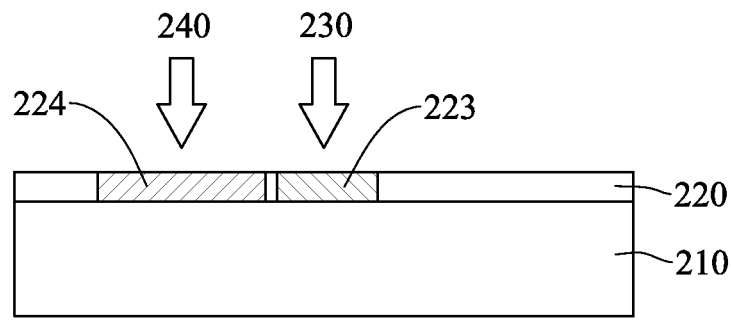
FIG. 1 is a diagram showing irradiation of a composite energy beam onto a layer of the powder.

The present invention may be applicable to the "additive manufacturing" technology, such as selective laser sintering, selective laser melting, Direct metal laser sintering, electron beam melting, laser engineering net shaping, and three-dimensional (3D) laser cladding. As to fabricate a targeted object, a powder is deposited onto a work surface first. Then, laser irradiated the powder and molten or sintered layer by layer to form the object. In the disclosure, a layer 220 of the powder is firstly formed on a surface of a substrate 210, as shown in FIG. 1. The powder may be made form metal, ceramic, polymer, or the mixture thereof. The substrate 210 may have either a two-dimensional plane surface or a three-dimensional surface of arbitrary shape.

In this disclosure, "transverse energy distribution profile" represents the spatial energy profile of an energy beam at a particular plane transverse to the beam propagation path. To selectively melt or sinter the layer 220 of the powder, a composite energy beam is produced in the embodiments. The composite energy beam includes two individual energy beams with different transverse energy distribution profiles. One of the two individual energy beams may strike the layer 220 at a first irradiation spot such that the powder in the first irradiation spot is melted. The other is used to adjust temperature variation of the powder in the first irradiation spot before and/or after it is melted. Thus, the composite energy beam can be used to melt the powder selectively and control the temperature during the solidification. So that the powder can be formed to be an object with desired structures and properties. In the embodiments, the composite energy beam can be obtained from a heating source such as continuous-wave laser, pulsed laser, electron beam generator, or electric arc generator.

Transverse energy distribution profile of an energy beam plays a key role in this disclosure. An energy beam emitted from the heating source may have a first transverse energy distribution profile. The energy beam can be split into a first directed beam and a second directed beam according to energy splitting ratio. After being split, the first and second directed beams may have transverse energy distribution profiles basically identical to the first transverse energy distribution profile. In the following embodiments, a Gaussian beam emitted from a continuous-wave laser works as an energy beam to explain the current invention.

A Gaussian beam is a light beam whose transverse energy or intensity distribution can be well approximated by a Gaussian function. Its transverse energy distribution profile has a shape of disc in which the energy is the highest in the renter and is decreased toward the outer portion. The first directed beam, split from the energy beam, also has a transverse energy distribution in a Gaussian distribution and a transverse energy distribution profile in a shape of circle. That is to say, a Gaussian beam is transformed into another Gaussian beam (characterized by a different set of parameters). As the first directed beam 230 is directed to the surface of the substrate 210, it strikes the layer 220 of the powder at a first irradiation spot 223 as shown in FIG. 1. The first directed beam 230 may heat the layer 220 of the powder in the first irradiation spot 223 such that it can be melted. In another embodiment, the energy beam may have a flat-top profile of transverse energy distribution. The energy distribution is made uniform in the transverse energy distribution profile.

On the other hand, the second directed beam is then shaped such that its transverse energy distribution profile is transformed from the first transverse energy distribution profile to a second transverse energy distribution profile according to practical requirement. In the embodiment, the second directed beam, split from the energy beam, also has a transverse energy distribution in a Gaussian distribution and a transverse energy distribution profile in a shape of circle. After being shaped, the second directed beam has a transverse energy distribution profile in a shape of rectangle. It is not limited thereto, the second transverse energy distribution profile may have a shape of line, oval, triangle, teardrop, or dumbbell. Moreover, energy magnitude and energy distribution of the second directed beam can be set according to practical requirement. So that the powder can be well-sintered to form an object with desired structures and properties.

Figure 2:
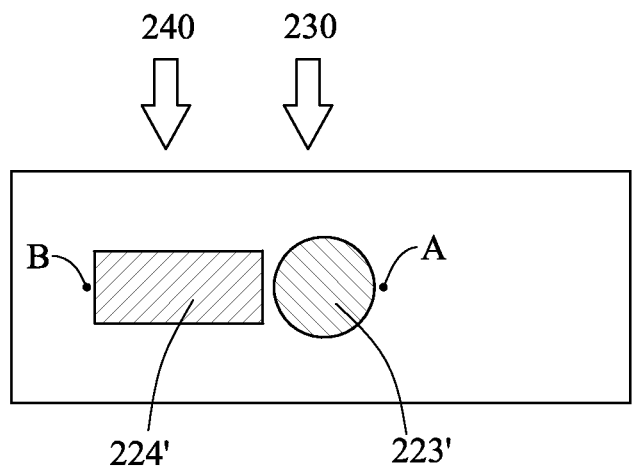
FIG. 2 is the transverse energy distribution profile of the composite energy beam on the surface of the substrate.

As the second directed beam 240 is directed to the surface of the substrate 210, it strikes the layer 220 of the powder at a second irradiation spot 224 as shown in FIG. 1. The second directed beam 240 may heat the layer 220 of the powder in the second irradiation spot 224 such that the temperature therein can be properly controlled. The first directed beam 230 and the second directed beam 240 can be combined to a composite energy beam, which irradiates the surface of the substrate 210. FIG. 2 schematically shows the transverse energy distribution profile of the composite energy beam on the surface of the substrate 210. We may arrange the composite energy beam so that the transverse energy distribution profile scans the layer 220 of the powder in a predetermined path. Thus, the layer 220 of the powder can be selectively melted or sintered by the composite energy beam. The first directed beam 230 may have a transverse energy distribution profile 223' in a circular shape. The second directed beam 240 may have a transverse energy distribution profile 224' in a shape of rectangular with a predetermined length. Means for realizing the above-recited energy beams will be described in detail later.

Figure 3:
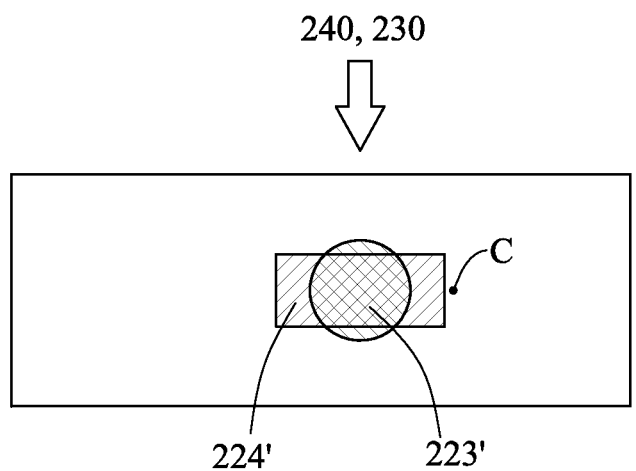
FIG. 3 is the transverse energy distribution profile of the composite energy beam on the surface of the substrate.

When the composite energy beam is directed to the surface of the substrate 210. The beam spots or transverse energy distribution profiles of the first directed beam 230 and the second directed beam 240 may be separated or overlapped. For example, the transverse energy distribution profile 223' of the first directed beam 230 may neighbor but not overlap the transverse energy distribution profile 224' of the second directed beam 240 as shown in FIG. 2. Alternatively, the transverse energy distribution profile 223' of the first directed beam 230 may overlap the transverse energy distribution profile 224' of the second directed beam 240 and their centers coincide with each other as shown in FIG. 3.

Figure 4A:
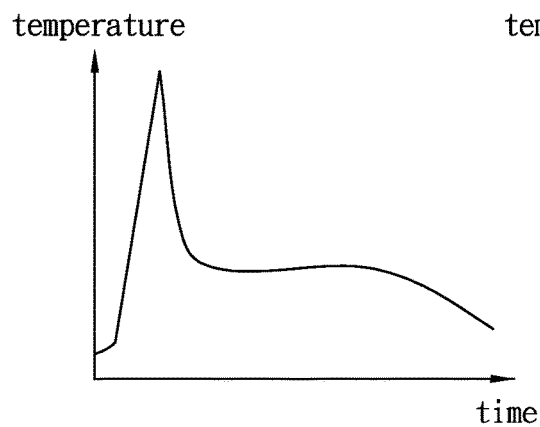
FIGS. 4A-4D are time-dependent temperature curves with various irradiation arrangements of composite beam.
Figure 4B:
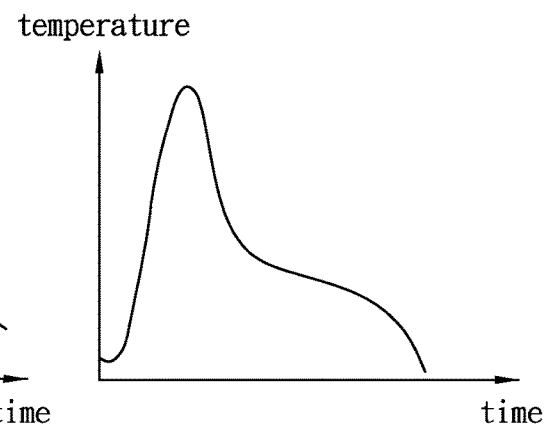
Figure 4C:
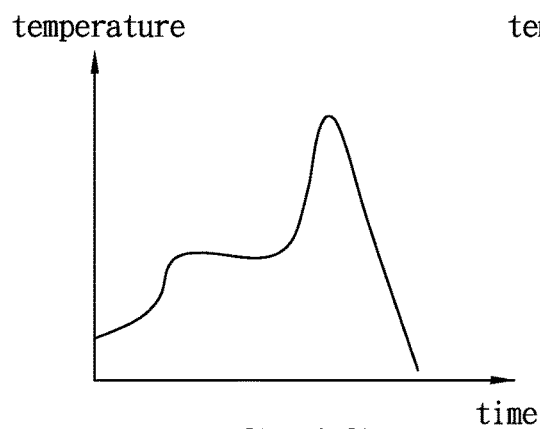
Figure 4D:
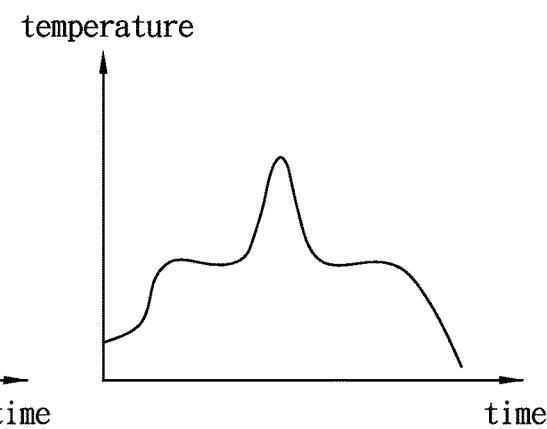

In one embodiment, the moving direction of the composite energy beam can be dynamically regulated. So that the transverse energy distribution profile (or beam spot) of the composite energy beam scans the surface of the substrate 210 in a predetermined path. That causes temperature changing in the irradiated region of the layer 220 of the powder. In a first example, the composite energy beam may move rightwards. The transverse energy distribution profiles 223' and 224' of the first directed beam 230 and the second directed beam 240 neighboring but not overlapping with each other move synchronously towards the right and gradually pass through a point A in FIG. 2. The powder at the point A in the layer 220 would experience a time-dependent temperature curve as shown in FIGS. 4A and 4B. Which indicates that the second directed beam 240 holding cooling temperature of the melted powder or regulating the temperature of the melted powder to decrease gradually. In a second example, the composite energy beam may move leftwards. The transverse energy distribution profiles 223' and 224' of the first directed beam 230 and the second directed beam 240 neighboring but not overlapping with each other move synchronously towards the left and gradually pass through a point B in FIG. 2. The powder at the point B in the layer 220 would experience a time-dependent temperature curve as shown in FIG. 4C. Which indicates that the second directed beam 240 gradually increasing the temperature of the powder in the layer 220. Thereby, the second directed beam 240 may be used to preheat the powder before it is melted. In a third example, the composite energy beam may move rightwards. The transverse energy distribution profiles 223' and 224' of the first directed beam 230 and the second directed beam 240 overlapping each other move synchronously towards the right and gradually pass through a point C as shown in FIG. 3. The powder at the point C in the layer 220 would experience a time-dependent temperature curve as shown in FIG. 4D. Which indicate that the second directed beam 240 gradually increasing the temperature of the powder in the layer 220 before it is melted and gradually decreasing the temperature of the powder in the layer 220 after it is melted.

Refer to FIG. 2, where the second irradiation spot 224 is close to the first irradiation spot 223. The first directed beam 230 and the second directed beam 240 may heat the surface of the substrate 210 synchronously. As the two directed beam 230 and 240 move rightwards, the first irradiation spot 223 and the second irradiation spot 224 may also move rightwards. The second irradiation spot 224 follows the first irradiation spot 223. Thereby, the first directed beam 230 is used to heat the layer 220 of the powder in the first irradiation spot 223 such that it can be melted. As the first directed beam 230 keeping on moving rightwards, the melted powder at the original location of the first irradiation spot 223 may experience a decreasing temperature and start solidifying. Subsequently, the second directed beam 240 follows the first directed beam 230 to scan rightwards. So the second irradiation spot 224 will pass through the original location of the first irradiation spot 223. The second directed beam 240 can provide the melted and solidifying powder with additional heat so that the cooling process of the melted powder can be properly controlled. Thus, the powder can be well-sintered to form an object with desired structures and properties.

Two ways are provided below to realize the synchronous scanning of the first and second directed beams 230 and 240. The first way is to move the surface of the substrate 210 while irradiate the surface with the first and second directed beams 230 and 240. The second way is to let the first and second directed beams 230 and 240 scan the surface of the substrate 210 synchronously so that the first irradiation spot 223 and the second irradiation spot 224 synchronously move on the surface of the substrate 210. Moreover, the first directed beam 230 may have a transverse energy distribution profile in a circular shape. The second directed beam 240 has a transverse energy distribution profile in a shape of line, rectangle, oval, triangle, teardrop or dumbbell with a length about two times the diameter of the first directed beam. The first directed beams 230 may have a transverse energy distribution profile with an area between 1 $\mu m^2$ and 100 $mm^2$. The first directed beam 230 may have a transverse energy density from 0.01 to 0.99 times that of the second directed beam 240.

Figure 5:
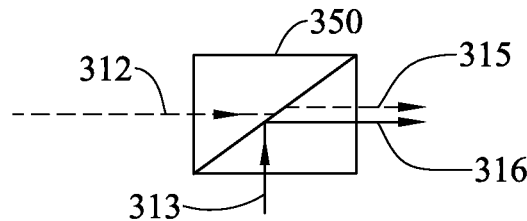
FIG. 5 shows a block diagram of a composite beam generator according to a first embodiment of the present disclosure.

In the following embodiment, a composite beam generator is constructed for melting or sintering powder based on laser beams. FIG. 5 schematically shows a block diagram of a composite beam generator 300 according to a first embodiment of the present disclosure. The composite beam generator 300 includes a first directed beam 312, a second directed beam 313, and a beam combiner 350. Each of the first and second directed beams 312 and 313 may be a continuous-wave laser beam or a pulsed laser beam with a wavelength between 0.2 $\mu m$ and 100 $\mu m$. The first directed beam 312 is a Gaussian beam, with a transverse energy distribution profile in a shape of circle. The first directed beam 312 is directed to the powder via the beam combiner 350 and strikes the powder at a first irradiation spot. The first directed beam 312 works for heating the powder in the first irradiation spot 223 such that the powder can be melted. On the other hand, the second directed beam 313 has a transverse energy distribution profile of non-circular which may have a shape of line, rectangle, oval, triangle, teardrop, or dumbbell. The second directed beam 313 works for adjusting a temperature of the powder before and/or after the powder is melted to control the solidification. The beam combiner 350 can be realized by a non-polarizing beam combiner, a polarizing beam combiner, and an optical fiber coupler. The polarizing beam combiner combines at least two incident light beams according to their polarization. As shown in FIG. 5, the beam combiner 350 accepts the first directed beam 312 from the left side and the second directed beam 313 from the bottom It subsequently combines them into a composite beam including a first output beam 315 and a second output beam 316.

Figure 6:
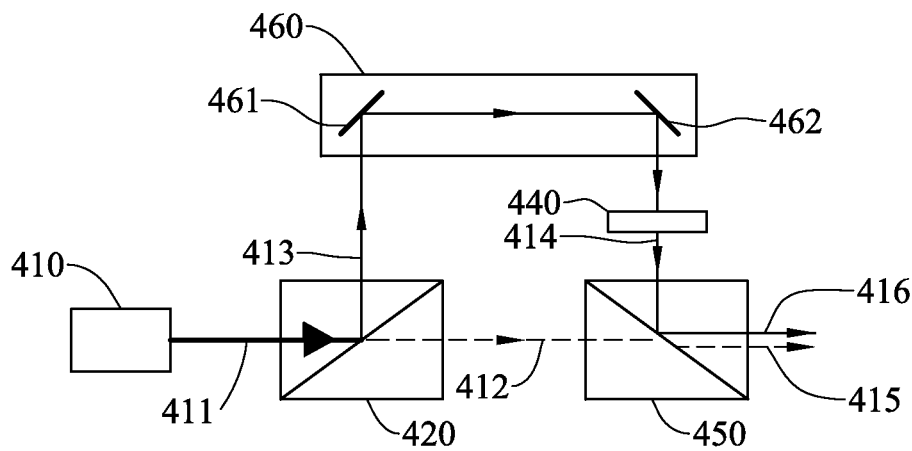
FIG. 6 shows a block diagram of a composite beam generator according to a second embodiment of the present disclosure.

In the following embodiments, various composite beam generators are constructed for melting or sintering powder, based on a single laser source. An optical beam emitted from a laser source will be split, shaped, and energy-adjusted in different ways. FIG. 6 schematically shows a block diagram of a composite beam generator 400 according to a second embodiment of the present disclosure. The composite beam generator 400 includes a laser source 410, a beam splitter 420, a beam shaper 440, a beam delivery unit 460, and a beam combiner 450. The laser source 410 may be a continuous-wave laser or a pulsed laser which emits an optical beam 411 with a wavelength between 0.2 μm and 100 μm. The optical beam 411 emitted from the laser source 410 is a Gaussian beam whose transverse energy or intensity distribution can be well approximated by a Gaussian function. Its transverse energy distribution profile has a shape of disc in which the energy is the highest in the center and is decreased toward the outer portion.

In the embodiment, the beam splitter 420 splits the optical beam 411 into a first directed beam 412 and a second directed beam 413. The beam delivery unit 460 is configured for guiding an optical beam. For example, it changes the proceeding direction of the second directed beam 413 and directs the second directed beam 413 to the beam shaper 440 as shown in FIG. 6. The beam delivery unit 460 can be realized by a mirror, an optical fiber, a prism, or the combination thereof. The beam delivery unit 460 includes two mirrors 461 and 462 in the embodiment.

The beam shaper 440 is configured for shaping the transverse energy distribution profile of an optical beam. For example, it shapes the second directed beam 413, as shown in FIG. 6, by transforming a circular transverse energy distribution profile into a transverse energy distribution profile of non-circular. Which may have a shape of line, rectangle, oval, triangle, teardrop, or dumbbell. After being shaped, the second directed beam is numbered as 414. The beam shaper 440 can be realized by a cylindrical lens, a diffractive optical element, and a spatial light modulator.

The beam combiner 450 can be realized by a beam non-polarizing combiner, a polarizing beam combiner, and an optical fiber coupler. As shown in FIG. 6, the beam combiner 450 accepts the first directed beam 412 from the left side and the second directed beam 414 from the top. Subsequently it combines them into a composite beam including a first output beam 415 and a second output beam 416. So that the composite beam can be applied to powder melting and/or sintering In the embodiment, the first output beam 415 may have a transverse energy distribution profile in a circular shape. The second output beam 416 has a transverse energy distribution profile in a shape of line, rectangle, oval, triangle, teardrop or dumbbell with a length about two times the diameter of the first. The first output beam 415 may have a transverse energy distribution profile with an area between 1 $\mu m^2$ and 100 $mm^2$. The first output beam 415 may have a transverse energy density from 0.01 to 0.99 times that of the second output beam 416.

Figure 7:
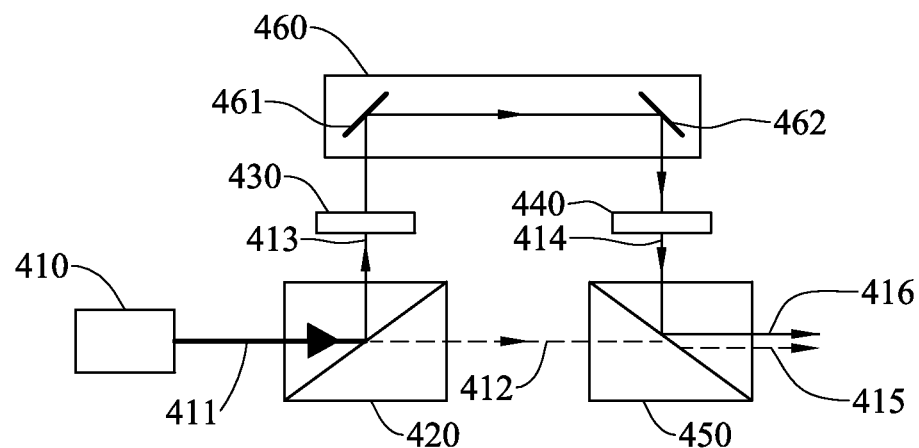
FIG. 7 shows a block diagram of a composite beam generator according to third and fourth embodiments of the present disclosure.

FIG. 7 schematically shows a block diagram of a composite beam generator 401 according to a third embodiment of the present disclosure. The composite beam generator 401 includes a laser source 410, a beam splitter 420, a energy regulator 430, a beam shaper 440, a beam delivery unit 460, and a beam combiner 450. In this embodiment, the elements other than the energy regulator 430 have the same functions and operations as the elements of the second embodiment in FIG. 6. The energy regulator 430 may be arranged between the beam splitter 420 and the beam delivery unit 460, configured for regulating an energy ratio of the second output beam 416 to the second directed beam 413 and functional as an energy regulator. The energy regulator 430 can be realized by a polarization regulator, an energy attenuator, and an energy amplifier. By means of regulating the energy magnitude of the second output beam 416, the transverse energy distribution of the composite beam can be properly controlled according to practical requirement.

Further, a fourth embodiment can be realized according to FIG. 7. The laser source 410 is the same as that of the second embodiment in FIG. 6. The beam splitter 420 is realized by a polarization beam splitter, which splits the optical beam 411 into two directed beams 412 and 413 of different linear polarizations, e.g. orthogonal polarizations. For example, the first directed beam 412 is horizontally polarized and the second directed beam 413 is vertically polarized.

In the embodiment, the energy regulator 430 is realized by a birefringent crystal plate, which has two orthogonal axes (a slow axis and a fast axis). The indices of refraction along the two orthogonal axes are different. When a light beam being launched to a birefringent crystal plate, its two polarization components experience the slow and the fast axis respectively. The two polarization components propagate in different velocities due to the different indices of refraction. So the birefringent crystal plate causes a phase difference between the two polarized beams. The behavior of a birefringent crystal plate depends on the thickness of the crystal plate, the wavelength of light, and the variation of the index of refraction. The energy regulator 430 is recited as a half-wave polarization regulator if the phase difference is $\pi$ and as a quarter-wave polarization regulator if the phase difference is $\pi/2$. Moreover, a polarization regulator can be used to alter the polarization of a linearly polarized beam. For example, if the polarization does not coincide with one of the axes but with an angle θ to the fast axis, then the polarization is rotated by 2θ for a half-wave polarization regulator. In the embodiment, the energy regulator 430 is a half-wave polarization regulator. After split from the beam splitter 420, the second directed beam 413 is directed to the polarization regulator 430, so that the polarization of the second directed beam 413 can be altered and subsequently the energy magnitude of the second directed beam 413 can be adjusted in conjunction with a polarizer or an optical element with polarizing function.

After being processed by the energy regulator 430, the second directed beam 413 is directed by the beam delivery unit 460 to the beam shaper 440 which is used to shape the transverse energy distribution profile of the second directed beam 413. In the embodiment, the beam shaper 440 is a cylindrical lens. The beam shaper 440 may transform a circular transverse energy distribution profile into a transverse energy distribution profile of non-circular, which may have a shape of line, rectangle, oval, triangle, teardrop, or dumbbell. After being shaped, the second directed beam 413 is then numbered as 414.

In the embodiment, the beam combiner 450 is a polarizing beam combiner which combines two optical beams in different propagation directions into a composite beam. The first directed beam 412, split from the beam splitter 420, and the second directed beam 414, shaped by the beam shaper 440, are directed to the beam combiner 450. Because the first directed beam 412 and the second directed beam 414 are polarized beams, the polarizing beam combiner 450 can impose polarization filtering on them to regulate their energy magnitudes. It subsequently outputs a first output beam 415 and a second output beam 416 which are combined as the composite beam. The composite beam is a composite energy beam based on a laser source to be applied to powder melting and/or sintering.

Figure 8:
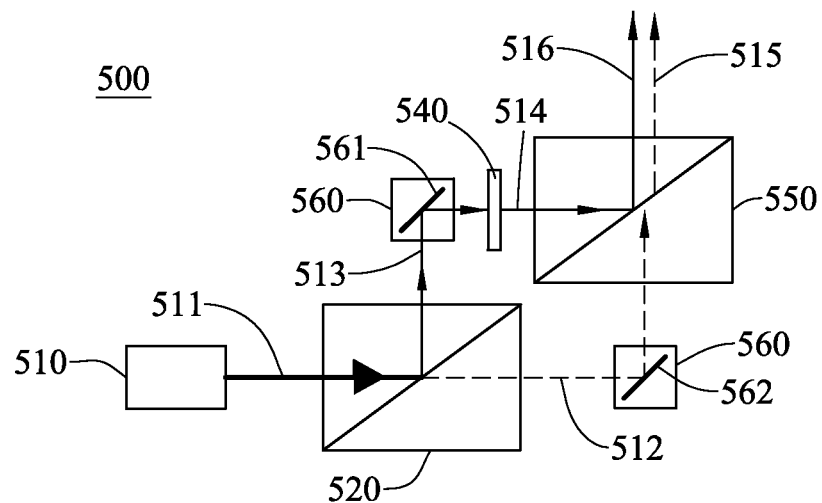
FIG. 8 shows a block diagram of a composite beam generator according to a fifth embodiment of the present disclosure.

FIG. 8 schematically shows a block diagram of a composite beam generator 500 according to a fifth embodiment of the present disclosure. The composite beam generator 500 includes a laser source 510, a beam splitter 520, a beam shaper 540, at least one beam delivery unit 560 and a beam combiner 550. It has the same functions and operations as the laser source 410, the beam splitter 420, the beam shaper 440, the beam delivery unit 460 and the beam combiner 450 of the second embodiment in FIG. 6. The laser source 510 may be a continuous-wave laser or a pulsed laser which emits an optical beam 511 with a wavelength between 0.2 μm and 100 μm. The optical beam 511 emitted from the laser source 510 is a Gaussian beam with a circular transverse energy distribution profile. The beam splitter 520 splits the optical beam 511 into a first directed beam 512 and a second directed beam 513.

As shown in FIG. 8, the second directed beam 513 is directed by the beam delivery unit 560, e.g. a mirror 561, to the beam shaper 540. The beam shaper 540 shapes the second directed beam 513 by transforming a circular transverse energy distribution profile into a transverse energy distribution profile of non-circular which may have a shape of line, rectangle, oval, triangle, teardrop, or dumbbell. In the embodiment, the beam shaper 540 is a cylindrical lens. The first directed beam 512 is directed by the other beam delivery unit 560, e.g. a mirror 562, to the beam combiner 550. The beam combiner 550 is a beam combiner cube in the embodiment. The beam combiner 550 accepts the first directed beam 512 from the bottom and the second directed beam 514 from the left side and subsequently combines them into a composite beam which includes a first output beam 515 and a second output beam 516. So that the composite beam can be applied to powder melting and/or sintering.

Figure 9:
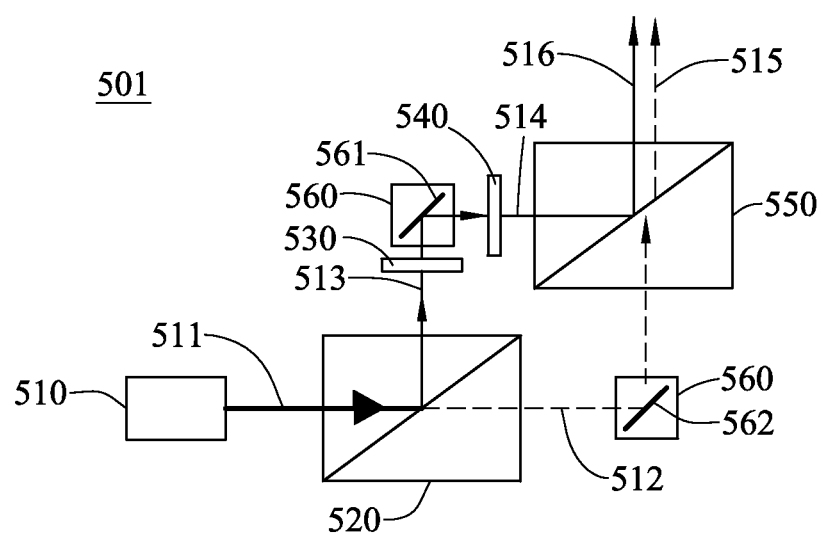
FIG. 9 shows a block diagram of a composite beam generator according to sixth and seventh embodiments of the present disclosure.

FIG. 9 schematically shows a block diagram of a composite beam generator 501 according to a sixth embodiment of the present disclosure. The composite beam generator 501 includes a laser source 510, a beam splitter 520, a energy regulator 530, a beam shaper 540, at least one beam delivery unit 560, and a beam combiner 550. The elements, other than the energy regulator 530, in this embodiment have the same functions and operations as the elements of the fifth embodiment in FIG. 8. The energy regulator 530 may be arranged between the beam splitter 520 and the beam delivery unit 560 (e.g. a mirror 561), configured for regulating an energy ratio of the second output beam 516 to the second directed beam 513. By means of regulating the energy magnitude of the second output beam 516, the transverse energy distribution of the composite beam can be properly controlled according to practical requirement.

Further, a seventh embodiment can be realized according to FIG. 9. The laser source 510 is the same as that of the sixth embodiment in FIG. 8. The beam splitter 520 is realized by a polarization beam splitter, which splits the optical beam 511 into two directed beams 512 and 513 of different linear polarizations, e.g. orthogonal polarizations. For example, the first directed beam 512 is horizontally polarized and the second directed beam 513 is vertically polarized.

The energy regulator 530 can be realized by a polarization regulator, an energy attenuator, and an energy amplifier. After split from the beam splitter 520, the second directed beam 513 is directed to the energy regulator 530, so that the polarization of the second directed beam 513 can be altered and subsequently the energy magnitude of the second directed beam 513 can be adjusted in conjunction with a polarizer or an optical element with polarizing function. After processed by the energy regulator 530, the second directed beam 513 is directed by the beam delivery unit 560 (e.g. a mirror 561) to the beam shaper 540 which is used to shape the transverse energy distribution profile of the second directed beam 513. In the embodiment, the beam shaper 540 is a cylindrical lens. The beam shaper 540 may transform a circular transverse energy distribution profile into a transverse energy distribution profile of non-circular which may have a shape of line, rectangle, oval, triangle, teardrop, or dumbbell. After being shaped, the second directed beam 513 is then numbered as 514. The beam combiner 450 is a polarizing beam combiner. The first directed beam 512, split from the beam splitter 520, and the second directed beam 514, shaped by the beam shaper 540, are respectively directed by the mirrors 562 and 561 to the beam combiner 550. Because the first directed beam 512 and the second directed beam 514 are polarized beams, the polarizing beam combiner 550 can impose polarization filtering on them to regulate their energy magnitudes. It subsequently outputs a first output beam 515 and a second output beam 516 which are combined as the composite beam. The composite beam is a composite energy beam based on a laser source to be applied to powder melting and/or sintering.

Figure 10:
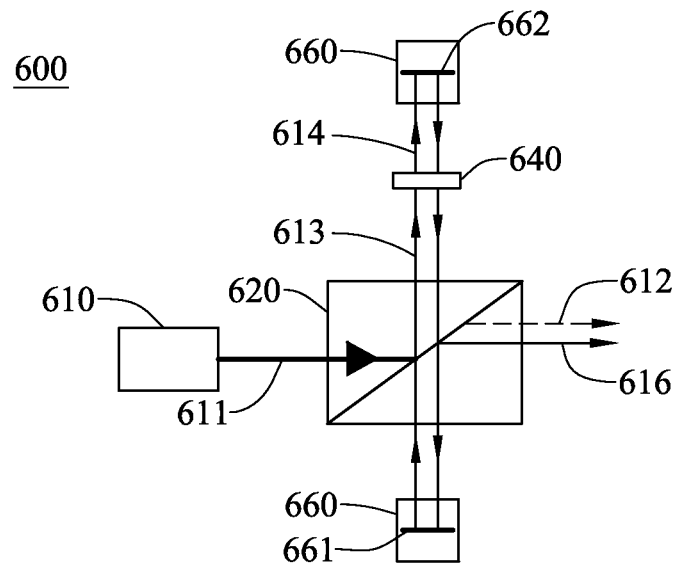
FIG. 10 shows a block diagram of a composite beam generator according to an eighth embodiment of the present disclosure.

FIG. 10 schematically shows a block diagram of a composite beam generator 600 according to an eighth embodiment of the present disclosure. The composite beam generator 600 includes a laser source 610, a beam splitter/combiner 620, a beam shaper 640, and at least one beam delivery unit 660. The laser source 610, the beam shaper 640 and the beam delivery unit 660 have the same functions and operations as the laser source 410, the beam shaper 440 and the beam delivery unit 460 of the second embodiment in FIG. 6. The beam splitter/combiner 620 acts as a beam splitter and a beam combiner at the same time. Taking FIG. 10 as an example, the beam splitter/combiner 620 may act as a beam splitter which splits the optical beam 611 into a first directed beam 612 rightwards and a second directed beam 613 upwards. Also, the beam splitter/combiner 620 may act as a beam combiner which accepts the first directed beam 612 and the second directed beam 614. It subsequently combines them into a composite beam, which includes output beams 612 and 616. The laser source 610 may be a continuous-wave laser or a pulsed laser which emits an optical beam 611 with a wavelength between 0.2 μm and 100 μm. The optical beam 611 emitted from the laser source 610 is a Gaussian beam with a circular transverse energy distribution profile. The beam splitter/combiner 620 splits the optical beam 611 into a first directed beam 612 and a second directed beam 613.

As shown in FIG. 10, the second directed beam 613 is directed to the beam shaper 640, which shapes the second directed beam 613 by transforming a circular transverse energy distribution profile into a transverse energy distribution profile of non-circular which may have a shape of line, rectangle, oval, triangle, teardrop, or dumbbell. In the embodiment, the beam shaper 640 is a cylindrical lens. The second directed beam 614 is directed by the beam delivery unit 660 (i.e. the mirror 662) to and through the beam splitter/combiner 620 and directed by the beam delivery unit 660 (i.e. the mirror 661) to the beam splitter/combiner 620. After the beam splitter/combiner 620, the second directed beam 614 is numbered as 616. The beam splitter/combiner 620 combines the first directed beam 612 and the second directed beam 616 into a composite beam. So that the composite beam can be applied to powder melting and/or sintering.

Figure 11:
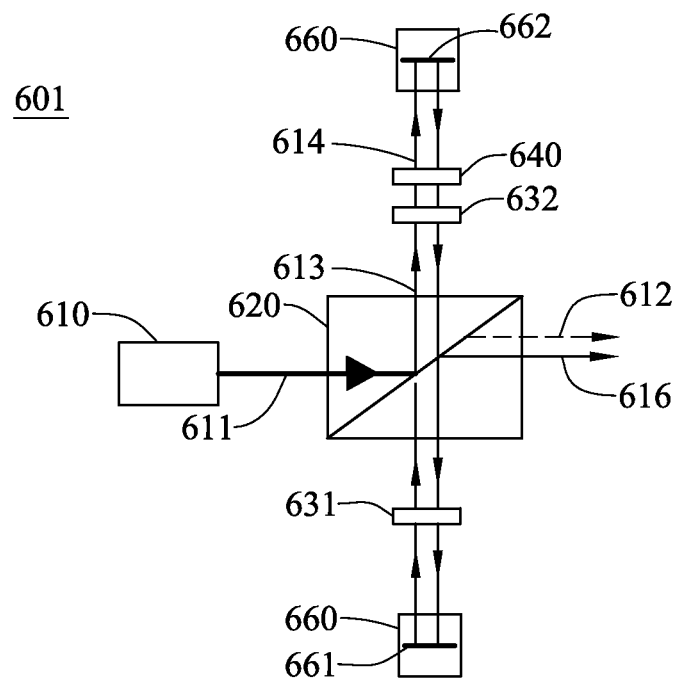
FIG. 11 shows a block diagram of a composite beam generator according to ninth and tenth embodiments of the present disclosure.

FIG. 11 schematically shows a block diagram of a composite beam generator 601 according to a ninth embodiment of the present disclosure. The composite beam generator 601 includes a laser source 610, a beam splitter/combiner 620, two energy regulators 631 and 632, a beam shaper 640, and at least one beam delivery unit 660. The elements, other than the energy regulators 631 and 632, in this embodiment have the same functions and operations as the elements of the eighth embodiment in FIG. 10. The energy regulator 631 may be arranged between the beam splitter 620 and the beam delivery unit 660 (i.e. the mirror 661) which is configured for regulating energy magnitude of the second directed beam 613. The energy regulator 631/632 can be realized by a polarization regulator, an energy attenuator, and an energy amplifier. By means of regulating the energy magnitude of the second directed beam 613, the transverse energy distribution of the composite beam can be properly controlled according to practical requirement.

Further, a tenth embodiment can be realized according to FIG. 11. The laser source 610 is the same as that of the ninth embodiment in FIG. 10. The beam splitter/combiner 620 is realized by a polarization beam splitter which splits the optical beam 611 into two directed beams 612 and 613 of different linear polarizations, e.g. orthogonal polarizations. For example, the first directed beam 612 is horizontally polarized and the second directed beam 613 is vertically polarized. The energy regulators 631 and 632 can be realized by a polarization regulator, an energy attenuator, and an energy amplifier. After split from the beam splitter/combiner 620, the second directed beam 613 is directed to the energy regulator 632, so that the polarization of the second directed beam 613 can be altered. Subsequently, the energy magnitude of the second directed beam 613 can be adjusted by a polarizer or an optical element with polarizing functions. After being processed by the energy regulator 632, the second directed beam 613 is directed to the beam shaper 640 which is used to shape the transverse energy distribution profile of the second directed beam 613. In the embodiment, the beam shaper 640 is a cylindrical lens. The beam shaper 640 may transform a circular transverse energy distribution profile into a transverse energy distribution profile of non-circular which may have a shape of line, rectangle, oval, triangle, teardrop, or dumbbell. After being shaped, the second directed beam 613 is numbered as 614 and directed by the beam delivery unit 660 (i.e. the mirror 662) to and through the beam splitter/combiner 620. The second directed beam 613 is then directed to the energy regulator 631. So that the polarization of the second directed beam 613 can be altered. Subsequently the energy magnitude of the second directed beam 613 can be adjusted by a polarizer or an optical element with polarizing functions. Then, the second directed beam 613 is directed by the beam delivery unit 660 (i.e. the mirror 661) to the beam splitter/combiner 620. After the beam splitter/combiner 620, the second directed beam 614 is numbered as 616. The beam splitter/combiner 620 combines the first directed beam 612 and the second directed beam 616 into a composite beam. Because the second directed beam 614 is a polarized beam, the beam splitter/combiner 620 can impose polarization filtering on them to regulate their energy magnitudes. It subsequently outputs the second directed beam 616. The beam splitter/combiner 620 combines the first directed beam 612 and the second directed beam 616 into the composite beam. The composite beam is a composite energy beam based on a laser source to be applied to powder melting and/or sintering.

Figure 12:
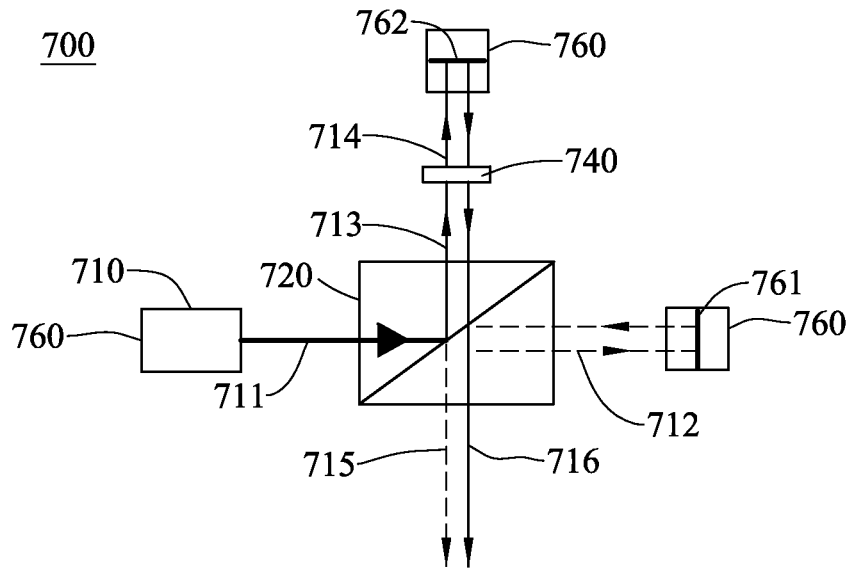
FIG. 12 shows a block diagram of a composite beam generator according to an eleventh embodiment of the present disclosure.

FIG. 12 schematically shows a block diagram of a composite beam generator 700 according to an eleventh embodiment of the present disclosure. The composite beam generator 700 includes a laser source 710, a beam splitter/combiner 720, a beam shaper 740, and at least one beam delivery unit 760. The laser source 710, the beam shaper 740 and the beam delivery unit 760 have the same functions and operations as the laser source 410, the beam shaper 440 and the beam delivery unit 460 of the second embodiment in FIG. 6. The beam splitter/combiner 720 acts as a beam splitter and a beam combiner at the same time. Taking FIG. 12 as an example, the beam splitter/combiner 720 may act as a beam splitter, which splits the optical beam 711 into a first directed beam 712 rightwards and a second directed beam 713 upwards. Also, the beam splitter/combiner 720 may act as a beam combiner which accepts the first directed beam 712 and the second directed beam 714. It subsequently combines them into a composite beam which includes output beams 715 and 716. The laser source 710 may be a continuous-wave laser or a pulsed laser which emits an optical beam 711 with a wavelength between 0.2 μm and 100 μm. The optical beam 711 emitted from the laser source 710 is a Gaussian beam with a circular transverse energy distribution profile. The beam splitter/combiner 720 splits the optical beam 711 into a first directed beam 712 and a second directed beam 713.

As shown in FIG. 12, the second directed beam 713 is directed to the beam shaper 740, which shapes the second directed beam 713 by transforming a circular transverse energy distribution profile into a transverse energy distribution profile of non-circular which may have a shape of line, rectangle, oval, triangle, teardrop, or dumbbell. In the embodiment, the beam shaper 740 is a cylindrical lens. The second directed beam 714 is directed by the beam delivery unit 760 (i.e. the mirror 762) to the beam splitter/combiner 720. The first directed beam 712 is directed by the beam delivery unit 660 (i.e. the mirror 661) to the beam splitter/combiner 720. The beam splitter/combiner 720 accepts the first directed beam 712 from the right side and the second directed beam 714 from the top. It subsequently combines them into a composite beam which includes a first output beam 715 and a second output beam 716. So that the composite beam can be applied to powder melting and/or sintering.

Figure 13:
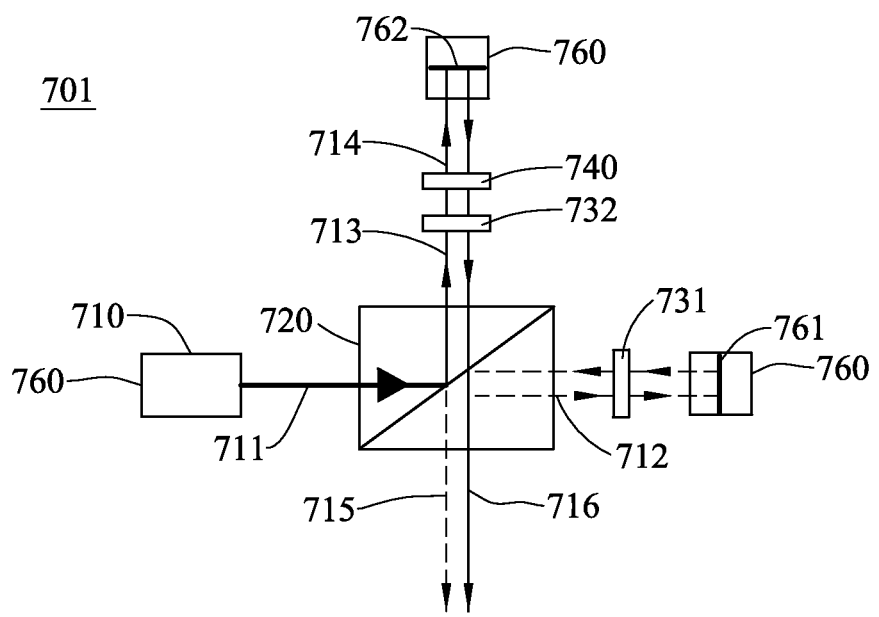
FIG. 13 shows a block diagram of a composite beam generator according to twelfth and thirteenth embodiments of the present disclosure.

FIG. 13 schematically shows a block diagram of a composite beam generator 701 according to a twelfth embodiment of the present disclosure. The composite beam generator 701 includes a laser source 710, a beam splitter/combiner 720, two energy regulators 731 and 732, a beam shaper 740, and at least one beam delivery unit 760. The elements, other than the energy regulators 731 and 732, in this embodiment have the same functions and operations as the elements of the eleventh embodiment in FIG. 12. The energy regulator 731 may be arranged between the beam splitter/combiner 720 and the beam delivery unit 760 (i.e. the mirror 761) which is configured for regulating an energy ratio of the first output beam 715 to the first directed beam 712. The energy regulator 732 may be arranged between the beam splitter/combiner 720 and the beam delivery unit 760 (i.e. the mirror 762) which is configured for regulating an energy ratio of the second output beam 716 to the second directed beam 713. The energy regulator 731/732 can be realized by a polarization regulator, an energy attenuator, and an energy amplifier. By means of regulating the energy magnitude of the first output beam 715 and the second output beam 716, the transverse energy distribution of the composite beam can be properly controlled according to practical requirement.

Further, a thirteenth embodiment can be realized according to FIG. 13. The laser source 710 is the same as that of the twelfth embodiment in FIG. 12. The beam splitter/combiner 720 is realized by a polarization beam splitter, which splits the optical beam 711 into a first directed beam 712 and a second directed beam 713 of different linear polarizations, e.g. orthogonal polarizations. For example, the first directed beam 712 is horizontally polarized and the second directed beam 713 is vertically polarized. The energy regulators 731 and 732 can be realized by a polarization regulator, an energy attenuator, and an energy amplifier. After split from the beam splitter 720, the first directed beam 712 is directed to the energy regulator 731, so that the polarization of the first directed beam 712 can be altered. Subsequently the energy magnitude of the first directed beam 712 can be adjusted in conjunction with a polarizer or an optical element with polarizing functions. After split from the beam splitter 720, the second directed beam 713 is directed to the energy regulator 732, so that the polarization of the second directed beam 713 can be altered. Subsequently the energy magnitude of the second directed beam 713 can be adjusted in conjunction with a polarizer or an optical element with polarizing functions. After processed by the energy regulator 732, the second directed beam 713 is directed to the beam shaper 740 which is used to shape the transverse energy distribution profile of the second directed beam 713. In the embodiment, the beam shaper 740 is a cylindrical lens. The beam shaper 740 may transform a circular transverse energy distribution profile into a transverse energy distribution profile of non-circular which may have a shape of line, rectangle, oval, triangle, teardrop, or dumbbell. After being shaped, the second directed beam 713 is numbered as 714 and directed by the beam delivery unit 760 (i.e. the mirror 762) to the beam splitter/combiner 720. The first directed beam 712 is directed by the beam delivery unit 760 (i.e. the mirror 761) to the beam splitter/combiner 720. The beam splitter/combiner 720 combines the first directed beam 712 and the second directed beam 714 into a composite beam which includes a first output beam 715 and a second output beam 716. Because the first directed beam 712 and the second directed beam 714 are polarized beams, the beam splitter/combiner 720 can impose polarization filtering on them to regulate their energy magnitudes. It subsequently outputs the first output beam 715 and the second output beam 716. The composite beam is a composite energy beam based on a laser source to be applied to powder melting or sintering.

With respect to the above description, it is to be realized that the optimum dimensional relationships for the parts of the disclosure. It includes variations in size, materials, shape, form, function and manner of operation, assembly and use. It is deemed readily apparent and obvious to one skilled in the art. All equivalent relationships to those illustrated in the drawings and described in the specification are intended to be encompassed by the present disclosure.

What is claimed is:

1. A composite beam generator for performing powder melting or sintering in additive manufacturing process, comprising:
    a first directed beam having a first transverse energy distribution profile for melting or sintering a powder;
    a second directed beam having a second transverse energy distribution profile of non-circular for adjusting the temperature variation of the melted powder to control the solidification; and
    a beam combiner for receiving the first directed beam and the second directed beam, and combining them into the composite beam.

2. The composite beam generator according to claim 1, wherein the beam combiner is selected from a group consisting of a non-polarizing beam combiner, a polarizing beam combiner, and an optical fiber coupler.

3. The composite beam generator according to claim 1, wherein the second directed beam comprising a shape of line, rectangle, oval, triangle, teardrop, or dumbbell.

4. The composite beam generator according to claim 1, wherein each of the first and second directed beam is a continuous-wave laser beam or a pulsed laser beam to control the solidification to control the solidification.

5. A composite beam generator for performing powder melting or sintering in additive manufacturing process, comprising:
    a beam splitter for splitting a beam into a first directed beam and a second directed beam;
    a beam shaper for shaping a transverse energy distribution profile of the second directed beam to non-circular;
    at least one beam delivery unit for guiding the first directed beam or the second directed beam; and
    a beam combiner for receiving the first directed beam and the second directed beam, and respectively generating a first output beam and a second output beam, and combining them into the composite beam.

6. The composite beam generator for performing powder melting or sintering according to claim 5, further comprising a laser source for generating an optical beam to be provided for the beam splitter.

7. The composite beam generator for performing powder melting or sintering according to claim 5, wherein the beam delivery unit comprises a mirror, an optical fiber, a prism, or the combination thereof.

8. The composite beam generator for performing powder melting or sintering according to claim 5, wherein the second directed beam has a transverse energy distribution profile comprising a shape of line, rectangle, oval, triangle, teardrop, or dumbbell.

9. The composite beam generator for performing powder melting or sintering according to claim 5, further comprising an energy regulator for regulating energy ratios of the first output beam to the first directed beam and the second output beam to the second directed beam.

10. The composite beam generator for performing powder melting or sintering according to claim 9, wherein the second directed beam after split from the beam splitter is directed to a polarization regulator, so that the second directed beam is regulated by the polarization regulator.

11. The composite beam generator for performing powder melting or sintering according to claim 9, wherein the energy regulator is selected from a group consisting of a polarization regulator, an energy attenuator, and an energy amplifier.

12. The composite beam generator for performing powder melting or sintering according to claim 5, wherein the beam splitter is selected from a group consisting of a non-polarizing beam splitter, a polarizing beam splitter and an optical fiber coupler.

13. The composite beam generator for performing powder melting or sintering according to claim 5, wherein the beam shaper is comprising a cylindrical lens, a diffractive optical element, and a spatial light modulator.

14. The composite beam generator for performing powder melting or sintering according to claim 5, wherein the beam combiner is selected from a group consisting of a non-polarizing beam combiner, a polarizing beam combiner, and an optical fiber coupler.

15. The composite beam generator for performing powder melting or sintering according to claim 6, wherein the laser source has a wavelength between 0.2 μm and 100 μm.

16. The composite beam generator for performing powder melting or sintering according to claim 6, wherein the laser source is comprising a continuous-wave laser, a pulsed laser, or the combination thereof.

17. A method for performing powder melting or sintering in additive manufacturing process, comprising the following steps of:
   providing a powder layer on a surface; and
   selectively irradiating the powder layer with a moving composite energy beam which includes a first directed beam and a second directed beam;
   wherein the first directed beam has a first transverse energy distribution profile for melting or sintering the powder; and
   wherein the second directed beam has a second transverse energy distribution profile with non-circular shape for adjusting the temperature variation of the melted powder layer to control the solidification.

18. The method according to claim 17, wherein the first transverse energy distribution profile has an area between 1 μm² and 100 mm².

19. The method according to claim 17, wherein the second directed beam has a absorbed energy density of the powder layer being from 0.01 to 0.99 times that of the first directed beam.

20. The method according to claim 17, wherein the second transverse energy distribution profile is comprising a shape of line, rectangle, oval, triangle, teardrop, or dumbbell.

21. The method according to claim 17, further comprising a step of adjusting an energy magnitude of the second directed beam.

22. The method according to claim 17, further comprising a step of adjusting an energy distribution of the second directed beam.

23. The method according to claim 17, wherein an energy source of the composite energy beam is comprising a continuous-wave laser beam, a pulsed laser beam, an electron beam, an electric arc, or the combination thereof.

24. The method according to claim 17, further comprising a step of dynamically regulating the propagation direction of the composite energy beam.

25. The method according to claim 17, wherein the second directed beam has a second transverse energy distribution profile of non-circular for adjusting the temperature variation of the powder layer before and after the powder is melted to control the solidification.

26. The method according to claim 17, wherein the second directed beam has a second transverse energy distribution profile of non-circular for adjusting the temperature variation of the powder layer before or after the powder is melted to control the solidification.

27. The method according to claim 17, wherein the powder is selective from group consisting of metal, ceramic, polymer, or the mixture thereof.

* * * * *